United States Patent
Karikallio (10) Patent No.: US 11,329,868 B2
(45) Date of Patent: May 10, 2022

(54) AUTOMATED NETWORK MONITORING AND CONTROL

(71) Applicant: ELISA OYJ, Helsinki (FI)

(72) Inventor: Henri Karikallio, Helsinki (FI)

(73) Assignee: ELISA OYJ, Helsinki (FI)

( * ) Notice: Subject to any disclaimer, the term of this patent is extended or adjusted under 35 U.S.C. 154(b) by 0 days.

(21) Appl. No.: 15/734,401

(22) PCT Filed: Jun. 26, 2019

(86) PCT No.: PCT/FI2019/050497
§ 371 (c)(1),
(2) Date: Dec. 2, 2020

(87) PCT Pub. No.: WO2020/002770
PCT Pub. Date: Jan. 2, 2020

(65) Prior Publication Data
US 2021/0226840 A1    Jul. 22, 2021

(30) Foreign Application Priority Data

Jun. 29, 2018 (FI) .................................. 20185596

(51) Int. Cl.
*H04L 12/24* (2006.01)
*H04L 12/26* (2006.01)
(Continued)

(52) U.S. Cl.
CPC ...... *H04L 41/0672* (2013.01); *H04L 41/0604* (2013.01); *H04L 43/0817* (2013.01); *H04L 43/0823* (2013.01)

(58) Field of Classification Search
CPC ............ H04L 41/0672; H04L 41/0604; H04L 43/0817; H04L 43/0823
(Continued)

(56) References Cited

U.S. PATENT DOCUMENTS 6,446,123 B1     9/2002  Ballantine et al.
6,665,262 B1 *  12/2003  Lindskog ............ H04L 41/0604
                                                           370/242
(Continued)

FOREIGN PATENT DOCUMENTS

EP     2262300 A1    12/2010
EP     3041283 A1     7/2016
(Continued)

OTHER PUBLICATIONS

Finnish Patent and Registration Office, Search Report, Application No. 20185596, dated Jan. 25, 2019, 2 pages.
(Continued)

*Primary Examiner* — Glenton B Burgess
*Assistant Examiner* — Patrick F Ngankam
(74) *Attorney, Agent, or Firm* — Ziegler IP Law Group, LLC (57) ABSTRACT

A computer implemented method of network monitoring and control. The method includes receiving alerts related to monitored devices; analyzing the alerts to identify a first alert related to a first monitored device; automatically performing at least one predefined action for the first monitored device based on the first alert; and after a first predefined period of time, checking whether the first alert has reappeared and responsively taking a further action.

19 Claims, 7 Drawing Sheets

(51) Int. Cl.
*H04L 41/0654* (2022.01)
*H04L 41/0604* (2022.01)
*H04L 43/0817* (2022.01)
*H04L 43/0823* (2022.01)

(58) Field of Classification Search
USPC .......................................................... 709/224
See application file for complete search history.

(56) References Cited

U.S. PATENT DOCUMENTS

| | | | |
|---|---|---|---|
| 7,120,633 | B1 | 10/2006 | Kromer |
| 9,585,034 | B1 | 2/2017 | Jadunandan et al. |
| 2002/0194319 | A1 | 12/2002 | Ritche |
| 2004/0215765 | A1 | 10/2004 | Asher |
| 2006/0233311 | A1 | 10/2006 | Adams et al. |
| 2006/0233313 | A1 | 10/2006 | Adams et al. |
| 2010/0234006 | A1* | 9/2010 | Vadlamudi ............ H04W 24/04 455/418 |
| 2011/0260879 | A1* | 10/2011 | Avner ................. G06F 11/0793 340/679 |
| 2014/0195670 | A1 | 7/2014 | Jain et al. |
| 2015/0249512 | A1 | 9/2015 | Adimatyam et al. |
| 2016/0036898 | A1 | 2/2016 | Curtis |
| 2016/0218911 | A1 | 7/2016 | Wessels |
| 2017/0126477 | A1 | 5/2017 | Ponnuswamy |
| 2017/0353991 | A1 | 12/2017 | Tapia |
| 2018/0091369 | A1 | 3/2018 | Cunningham et al. |
| 2018/0349482 | A1* | 12/2018 | Oliner ................. H04L 41/0681 |
| 2018/0367370 | A1 | 12/2018 | Tapia |
| 2019/0340094 | A1* | 11/2019 | Lu ........................... H04L 43/16 |
| 2019/0392328 | A1 | 12/2019 | Bulacio et al. |

FOREIGN PATENT DOCUMENTS

| | | |
|---|---|---|
| EP | 2871803 B1 | 12/2017 |
| FI | 128647 B | 9/2020 |
| WO | 2012034684 A1 | 3/2012 |
| WO | 2015028714 A1 | 3/2015 |

OTHER PUBLICATIONS

Patent Cooperation Treaty, International Search Report, Application No. PCT/FI209/050497, dated Sep. 6, 2019, 6 pages.
Patent Cooperation Treaty, Written Opinion of the International Searching Authority, Application No. PCT/FI2019/050497, dated Sep. 6, 2019, 7 pages.
Finnish Patent and Registration Office, Decision-Application Accepted, Application No. 20185597, Dated Sep. 30, 2020, 1 page.
Finnish Patent and Registration Office, Search Report, Application No. 20185597, dated Jan. 29, 2019, 2 pages.
Finnish Patent and Registration Office, Search Report, Application No. 20185598, dated Feb. 4, 2019, 2 pages.
Kazmi, Ahmad S, "Application of statistical sampling to predict faults from real time alarm data" Multitopic Conference (INMIC), 2011 IEEE 14th International, IEEE, XP032115235, DOI:10.1109/INMIC.2011.6151490 ISBN:978-1-4577-0654-7, Dec. 22, 2011, 6 pages.
Patent Cooperation Treaty, Notification of Transmittal of The International Search Report and The Written Opinion of The International Searching Authority, Application No. PCT/FI2019/050498, dated Sep. 24, 2019, 13 pages.
Patent Cooperation Treaty, Notification of Transmittal of the International Search Report and Written Opinion of the International Searching Authority, Application No. PCT/FI2019/050499, dated Aug. 28, 2019, 15 pages.
United States Patent and Trademark Office, Final Office Action, U.S. Appl. No. 15/734,447, dated Nov. 23, 2021, 16 pages.
United States Patent and Trademark Office, Non-Final Office Action, U.S. Appl. No. 15/734,447, dated Mar. 15, 2022, 14 pages.

* cited by examiner

AUTOMATED NETWORK MONITORING AND CONTROL

TECHNICAL FIELD

The present application generally relates to automated network monitoring and control.

BACKGROUND

This section illustrates useful background information without admission of any technique described herein representative of the state of the art.

A network operation center (NOC) is generally a location from which NOC personnel exercises monitoring and control over a network. NOC personnel are responsible for monitoring one or many networks for certain conditions that may require special attention to avoid degraded service. NOC personnel follow screens showing events received from network devices, ongoing incidents and general network performance. NOC personnel decide upon required actions based on information they see on the screens.

Automation of NOC functionality of telecommunication networks has been developed in order to improve efficiency of network monitoring and control and to reduce the amount of manual work and human errors. But automation of network monitoring and control is not a straightforward task to implement.

SUMMARY

Various aspects of examples of the disclosed embodiments are set out in the claims. Any devices and/or methods in the description and/or drawings which are not covered by the claims are examples useful for understanding the disclosed embodiments.

According to a first example aspect of the present disclosure, there is provided a computer implemented method of network monitoring and control. The method comprises
a. receiving alerts related to monitored devices;
b. analyzing the alerts to identify a first alert related to a first monitored device;
c. automatically performing at least one predefined action for the first monitored device based on the first alert; and
d. after a first predefined period of time, checking whether the first alert has reappeared and responsively taking a further action; and
e. identifying that the first alert has reappeared and performing another predefined action for the first network device, wherein said another predefined action is different from said at least one predefined action.

In an embodiment, the method further comprises, prior to analyzing the alerts, filtering the received alerts to reduce the number of alerts to be analyzed.

In an embodiment, filtering the received alerts comprises reducing number of alerts per monitored device per a second predefined period of time below a certain maximum number.

In an embodiment, filtering the received alerts comprises removing alerts considered not to require reparative actions and/or not to have customer impact.

In an embodiment, the method further comprises identifying that the first alert has not reappeared and responsively terminating processing of the first alert.

In an embodiment, the method further comprises identifying that the first alert has reappeared and performing another predefined action for the first network device.

In an embodiment, the method further comprises identifying that the first alert has reappeared and responsively repeating said predefined action.

In an embodiment, the method further comprises identifying that the first alert has reappeared and responsively generating a ticket for manual handling.

In an embodiment, the received alerts indicate one or more of the following: faulty or degraded operation, degraded performance, unavailable service, and a change in external conditions.

In an embodiment, the predefined action is an action affecting operation of the first monitored device.

In an embodiment, the predefined action comprises one or more of the following: resetting the monitored device, changing value of at least one parameter in the monitored device, closing a port in the monitored device, opening a port in the monitored device, and automatically generating a ticket for manual action.

In an embodiment, the first alert is an indication of a faulty cell and the predefined action comprises resetting the first monitored device.

In an embodiment, the first alert is an indication of a faulty cell and the predefined action comprises resetting the first monitored device and changing value of at least one parameter in the first monitored device.

In an embodiment, the first alert is an indication of no data transmission in a cell and the predefined action comprises reactivating data transmission in the first monitored device.

In an embodiment, the method further comprises identifying a second alert related to the first monitored device and selecting the predefined action based on combination of the first alert and the second alert.

In an embodiment, the first alert is an indication of a faulty cell and the second alert is an indication of a link failure and the predefined action comprises generating a ticket for manual action.

In an embodiment, the method further comprises identifying that more than two alerts related to the first monitored device have occurred during a third predefined period of time and responsively generating a ticket for manual action as the predefined action.

In an embodiment, the monitored devices are network devices of a telecommunication network, network devices of a radio access network, devices of a power grid, and/or devices of a cable or television network.

In an embodiment, the monitored devices are electronic devices that are communicatively connected to a network monitoring and control system performing the method.

According to a second example aspect of the present disclosure, there is provided a computer implemented method of network monitoring and control. The method comprises
a. receiving alerts related to monitored devices;
b. analyzing the alerts to identify a combination of at least two different alerts related to a first monitored device; and
c. automatically performing at least one predefined action for the first monitored device based on the identified combination of at least two different alerts.

Embodiments associated with the first aspect may be combined with the method of the second aspect, too.

According to a third example aspect of the present disclosure, there is provided an apparatus comprising a processor and a memory including computer program code; the memory and the computer program code configured to, with the processor, cause the apparatus to perform the method of the first or second aspect or any related embodiment.

According to a fourth example aspect of the present disclosure, there is provided a computer program comprising computer executable program code which when executed by a processor causes an apparatus to perform the method of the first or second aspect or any related embodiment.

The computer program of the third aspect may be a computer program product stored on a non-transitory memory medium.

Different non-binding example aspects and embodiments of the present disclosure have been illustrated in the foregoing. The embodiments in the foregoing are used merely to explain selected aspects or steps that may be utilized in implementations of the present disclosure. Some embodiments may be presented only with reference to certain example aspects of the disclosed embodiments. It should be appreciated that corresponding embodiments may apply to other example aspects as well.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION OF THE DRAWINGS

Example embodiments of the present disclosure and its potential advantages are understood by referring to FIGS. 1 through 5 of the drawings. In this document, like reference signs denote like parts or steps.

In an embodiment of the disclosed embodiments there is provided an automated network monitoring and control system. The developed automated solution can be employed in NOC functionality of a telecommunication network. Additionally or alternatively, the developed automated solution can be employed in monitoring and control of devices of a power grid or of devices of a cable or television network or some other group of monitored devices. In general, the developed automated solution can be employed for monitoring and control of any electronic devices that are communicatively connected to a network monitoring and control system implementing the automated solution. Various embodiments of the disclosed embodiments discussed in the following relate to monitoring of a telecommunication network, but it is to be understood that disclosed embodiments may be applied to other monitored devices, too. A monitored device in the sense of present disclosure can be any electronic device that is being monitored and/or controlled. It is to be noted that the group of monitored devices may be part of a larger system comprising also devices that are not being monitored. For example a telecommunication network may comprise a plurality of devices that are not being monitored or controlled through the present automated solution.

As operational load and network complexity increase due to increasing number of base stations and other network devices as well as increasing amount of manual work required for maintaining quality of network, there is increasing need for automation of network monitoring and control of telecommunication networks. At the same time the need for automated monitoring increases in other application areas, too.

Figure 1:
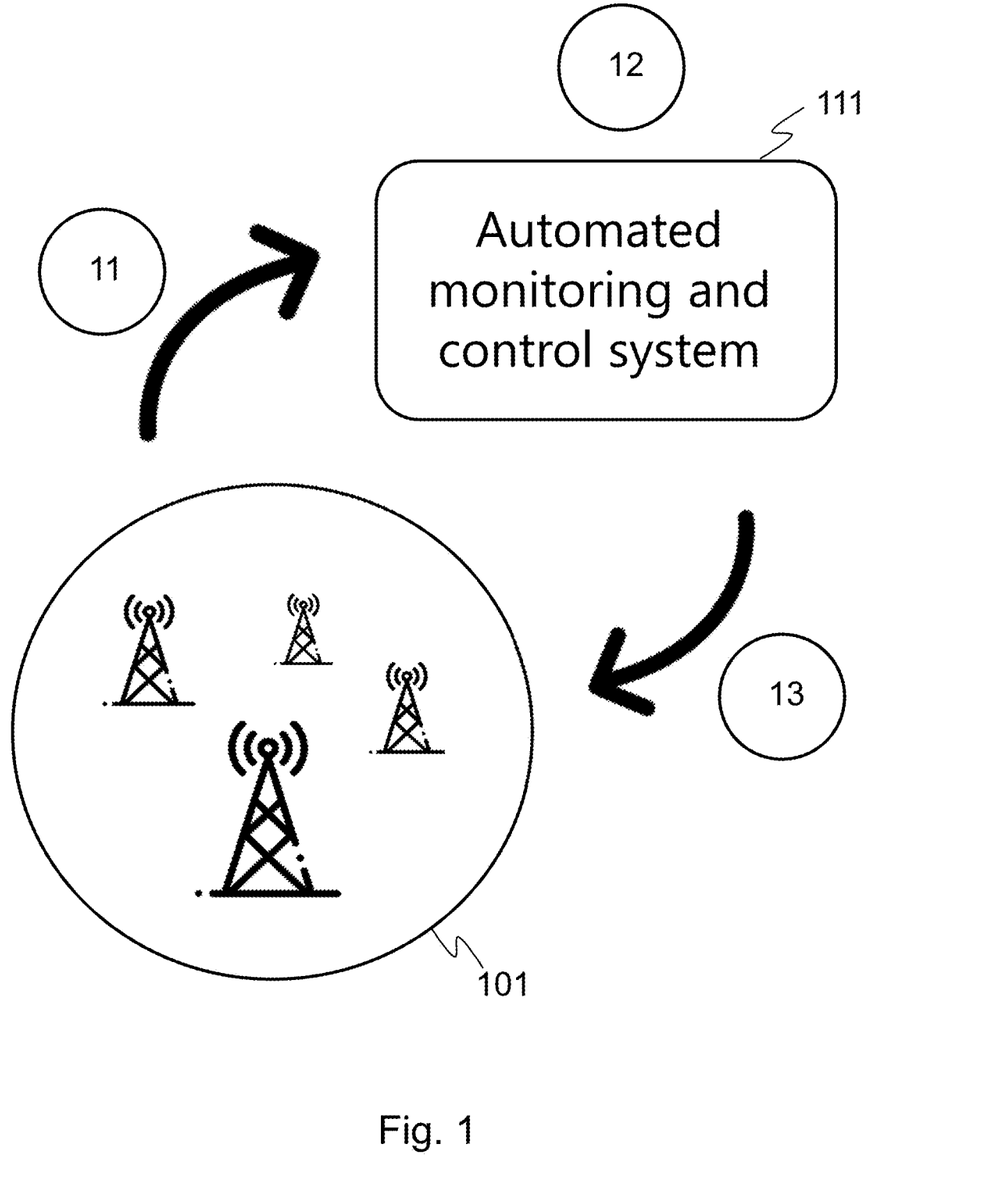
FIG. 1 shows an example scenario according to an embodiment.

FIG. 1 shows an example scenario according to an embodiment. The scenario shows a group of monitored devices 101 and an automated monitoring and control system 111. Alerts related to the monitored devices 101 are conveyed to the automated monitoring and control system 111 in phase 11. The cause for generation of an alert may be for example a fault in a monitored device such as one or more of the following: abnormal behaviour of a monitored device, hardware failure in a monitored device, exceeding a predefined threshold, synchronization problem, failure in operation of a functionality, excess load, insufficient storage capacity, insufficient processing resources, degraded performance etc. Performance of the monitored device or the whole system comprising the monitored device may be based on suitable performance indicators. The performance indicators may comprise for example counter values and/or Key Performance Indicator, KPI, values derived on the basis of one or more other performance indicators. In an example implementation, the performance indicators are observed over a predefined time and, if needed, an alert is generated on the basis of the observations. Additionally or alternatively, in a telecommunication network the cause for generation of an alert may be for example one or more of the following: abnormal behaviour of a base station, transmission problem in a network link, existence of an SNMP (Simple Network Management Protocol) trap, degraded throughput etc. Additionally or alternatively, the source of the alert may be an external system, such as a weather database or a traffic data source or a call data record (CDR) database.

The automated monitoring and control system 111 analyses the alerts in 12 to automatically decide on actions to be taken. The automatically decided actions are performed on one or more monitored devices in phase 13. It is to be noted that the action is decided and performed autonomously without human interaction. Furthermore, it is to be noted that the device originating the alert may be different from the device in which the automated action is applied. Additionally or alternatively, the automatically decided action may be generation of a ticket for manual action. In this case human actions may be used for solving the issue. The shown process is continuously repeated. Additionally, if the fault causing the alert(s) is not fixed by the automatic action and/or the alert reappears, a ticket for manual action may be generated.

Figure 2:
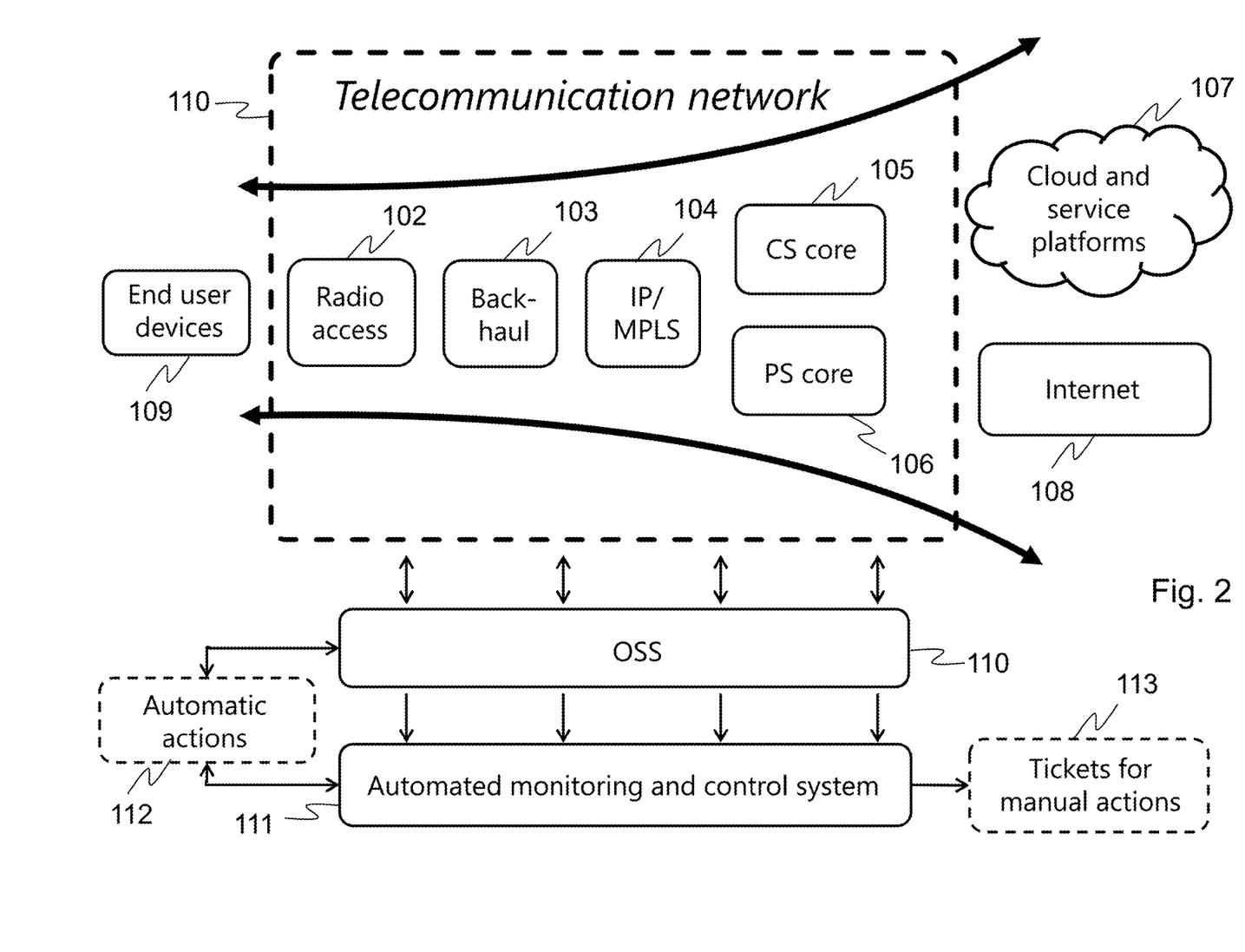
FIG. 2 shows a system according to an embodiment.

FIG. 2 shows a system according to an embodiment. The system comprises a telecommunication network 110, user devices 109, cloud and service platforms 107 and Internet 108. The telecommunication network 110 serves user devices 109 connected to the telecommunication network 110. The telecommunication network 110 provides communication services to the user devices such as for example access to cloud and service platforms 107 and Internet 108 and other systems. The telecommunication network 110 may be divided into a radio access network 102 comprising base stations that provide radio interface for connecting to the telecommunication network 110, a backhaul portion 103 that connects the radio interface of the radio access network 110 to other parts of the network, IP/MPLS (Internet Protocol/Multiprotocol Label Switching) portion 104 that provides data-carrying services for both circuit switched and packet switched communications, a circuit switched core network 105 for circuit switched communications and a packet switched core network 106 for packet switched communications.

Further the system of FIG. 2 comprises an OSS (Operations Support System) 110 and an automated monitoring and control system 111. The OSS continuously collects alerts from one or more monitored devices of the telecommunication network 110. For example hardware failure in a base station of the radio access network 102 causes generation of an alert that is then conveyed to the OSS. The alerts received in the OSS are conveyed to the automated monitoring and control system 111. The automated monitoring and control system 111 analyses the alerts to automatically decide on actions that may be required. The action may be an automatic action 112 performed on one or more monitored devices of the telecommunication network, such as resetting a monitored device, changing value of at least one parameter in a monitored device, closing a port in a monitored device, or opening a port in a monitored device. Alternatively or additionally the action may be generation of an alert ticket for manual action.

Figure 3:
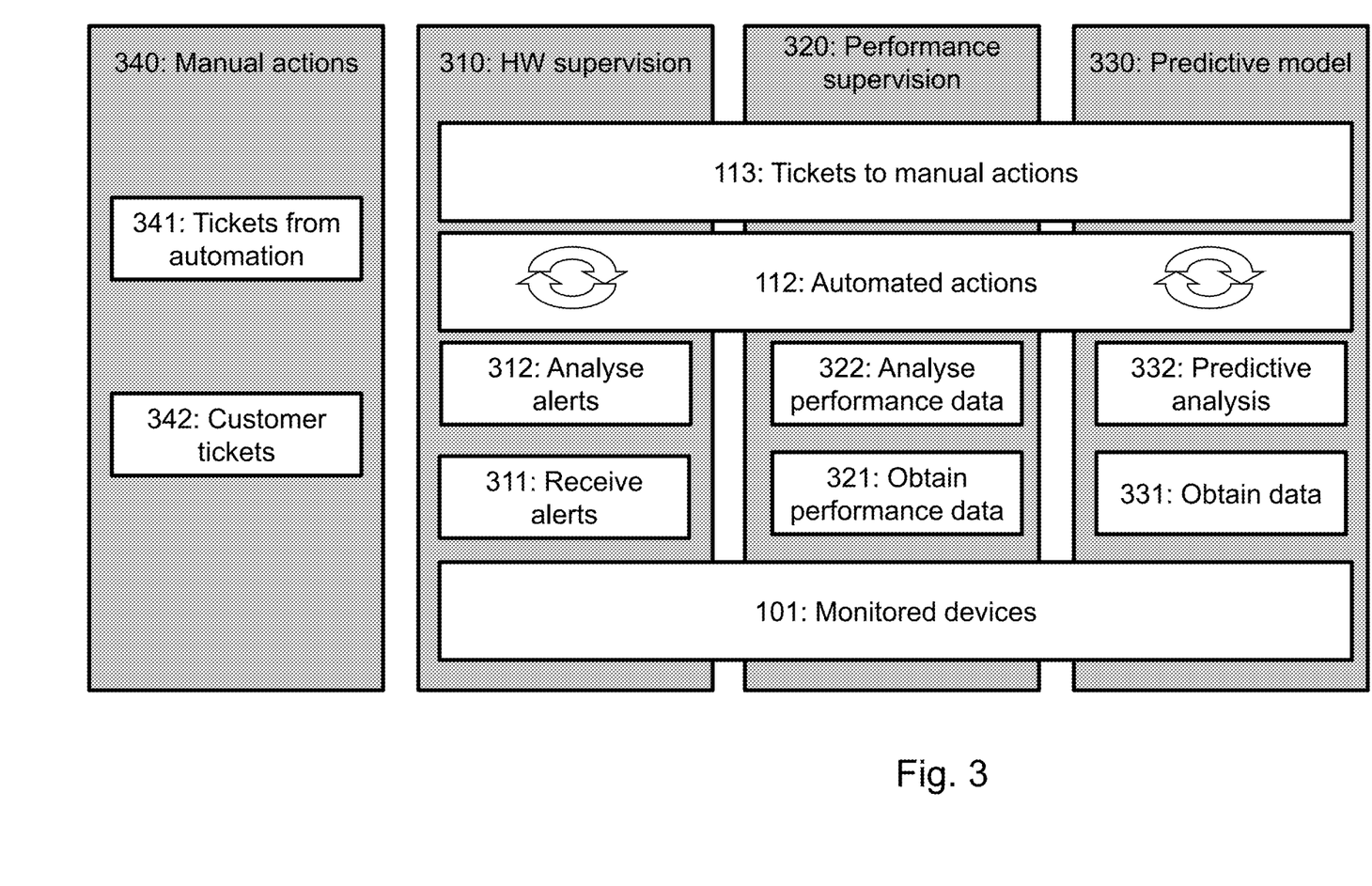
FIG. 3 shows logical components of an example system suited for implementing certain embodiments.

FIG. 3 shows logical components of an example system suited for implementing certain embodiments. The system is divided into a hardware supervision block 310, a performance supervision block 320, a predictive supervision block 330 and a manual actions block 340. The hardware supervision block 310 concerns collecting and analyzing 311, 312 alerts received from physical monitored devices, and automatically deciding and performing actions based on the analysis 112 and possibly generating tickets for manual actions 113. The performance supervision block 320 concerns collecting and analyzing performance data related to monitored devices 321, 322, and automatically deciding and performing actions based on the analysis 112 and possibly generating tickets for manual actions 113. The predictive supervision block 330 concerns collecting 331 data from the monitored devices, the data comprising for example alerts and/or performance data, and predicting forthcoming alerts or incidents based on collected data 332. The predicted alerts or incidents are then used for deciding and performing actions 112 and possibly for generating tickets for manual actions 113. The manual actions block 340 concerns manually performed work, such as 342: handling of tickets relating to customer complaints and 341: handling of tickets generated by the automatic process of one of the blocks 310-330. It is to be noted that data for the hardware supervision, performance supervision and predictive supervision blocks 310, 320, 330 may be collected from other external sources, too. For example weather or traffic data may be collected. Certain embodiments of present disclosure relate mainly but not exclusively to the hardware supervision block 310 and the performance supervision block 320.

FIGS. 4A-4E show flow diagrams illustrating example methods according to certain embodiments. The methods may be implemented in the automated monitoring and control system 111 of FIGS. 1 and 2. The methods are implemented in a computer and do not require human interaction. It is to be noted that the methods may however provide output that may be further processed by humans. The methods of FIGS. 4A-4E may be combined with each other and the order of phases conducted in each method may be changed expect where otherwise explicitly defined. Furthermore it is to be noted that performing all phases of the flow charts is not mandatory.

Figure 4A:
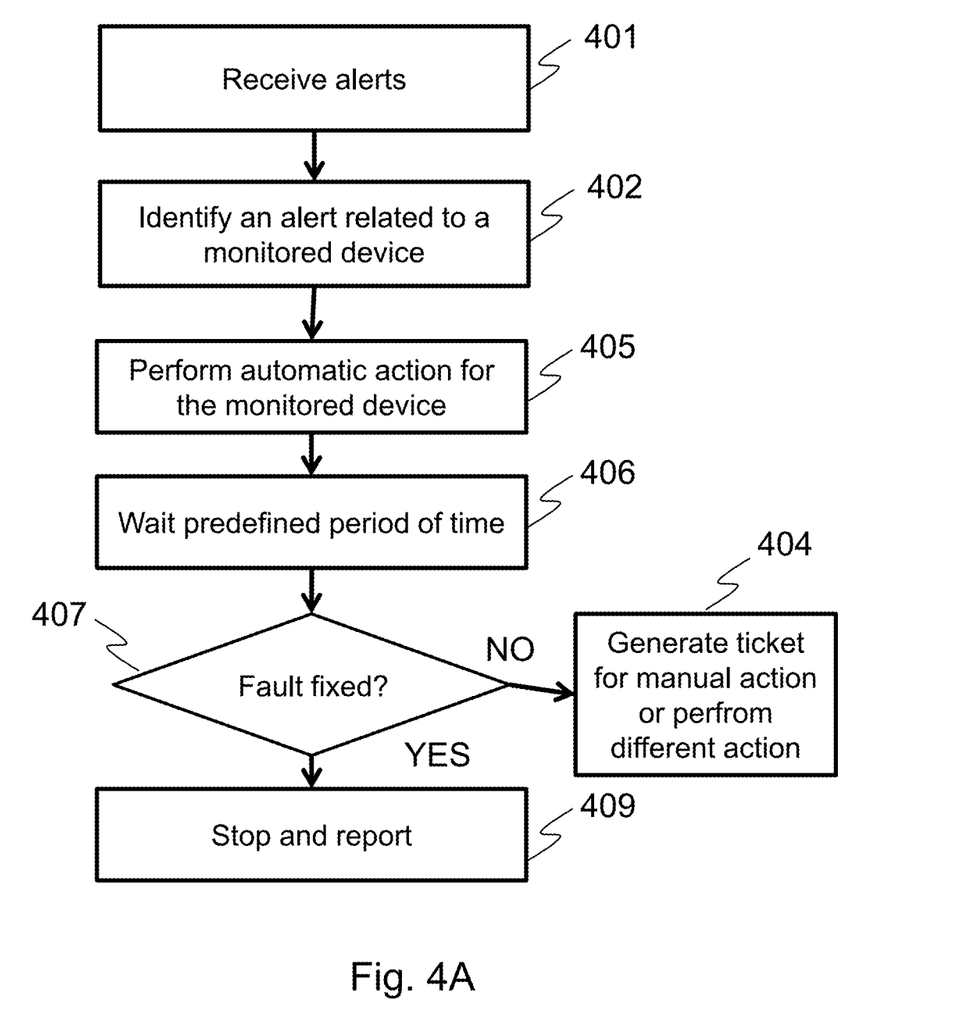
FIGS. 4A-4E show flow diagrams illustrating example methods according to certain embodiments.

FIG. 4A shows a flow diagram illustrating a method according to an embodiment of the present disclosure. The method comprises following phases:

Phase 401: Alerts are received. The alerts may be alerts concerning faults in operation of monitored devices. The faults may concern hardware problems, unavailable services or degraded performance as discussed in connection with FIG. 1. Additionally or alternatively the source of alerts may be an external source, such as weather database or traffic surveillance database.

Phase 402: The received alerts are analyzed and an alert related to a monitored device is identified. This phase may comprise filtering the alerts to reduce the number of alerts in further processing and/or classifying the alerts to different categories.

Phase 405: An action is performed for the monitored device based on the identified alert. The action may be chosen for example based on predefined rules or predefined logic charts. It is to be noted that more than one alert related to the monitored device may have been identified and the action may be chosen on the basis of more than one identified alert. That is, there may be a certain alert pattern that leads to a certain action, while one single alert may lead to another action. It is to be noted that in this context an action may comprise a single action or more than one actions. In an example embodiment, at least two different alerts are required for performing the action while one single alert does not necessarily result in an automatic action. For example, an alert indicating temperature increase combined with a critical alert in the monitored device may result in performing an automatic action, but alert indicating temperature increase alone does not necessarily lead to any action. In this way, types of problems that may be automatically identified and solved may be increased. At the same time, identification of problems that really require actions can be improved, while avoiding possibly unnecessary actions based on single alerts.

Phase 406: After performing the action, the process waits for a predefined period of time. This may be for example 5 min, 10 min, 20 min, 30 min, 1 h or 3 h.

Phase 407: It is checked whether the fault causing the alert identified in phase 402 was fixed. In an example embodiment this is implemented by checking if the identified alert reappears. If the fault was fixed, the process stops in phase 409 and a report is generated to log the action that was taken by the automatic process. If the fault was not fixed, a ticket for manual action is generated in phase 404. Alternatively or additionally, the process may return to phase 405 to repeat the action for the monitored device. Yet another alternative (shown as an alternative in phase 404 of FIG. 4A) is to perform for the monitored device another action different from the action performed in phase 405. By performing a different action in response to the alert reappearing, the automatic process may quickly proceed to finding an action that is effective for solving the problem. At the same time continuous repetition of an ineffective action is automatically avoided. In yet another alternative the process simply reports the action that was attempted without an actual ticket being generated.

By checking whether the alert reappears and generating a ticket for manual action if necessary or performing for the monitored device another action different from the action already performed, one achieves that the automatic system does not continue to perform the automatic action forever, if the first action is not fixing the problem.

In an embodiment the alert that is identified in phase 402 is a cell faulty alert in a telecommunication network and the action that is performed in phase 405 is resetting the network device (the monitored device may be for example a base station). For example existence of one or more of the following alerts may be considered a cell faulty alert: monitored device disconnected, base station down, cell out of service, cell unavailable, and transmission interruption.

Other embodiments comprise the following different embodiments:

The alert that is identified in phase 402 is an indication of no data transmission in a cell and the action that is performed in phase 405 is reactivating data transmission in the cell by resetting the monitored device.

The alert that is identified in phase 402 is an indication of no data transmission in a cell and the action that is performed in phase 405 is reactivating data transmission in the cell by deactivating and activating a GPRS (General Packet Radio Service) parameter.

The alert that is identified in phase 402 is an indication of a fault in VSWR (Voltage Standing Wave Ratio) antenna monitoring or a VSWR alarm and the action that is performed in phase 405 is generation of a ticket for manual action.

The alert that is identified in phase 402 is an indication of a power unit output voltage fault and the action that is performed in phase 405 is generation of a ticket for manual action.

The alert that is identified in phase 402 is an indication of a fault in the chain between a power unit and MHA (MastHead Amplifier) and the action that is performed in phase 405 is generation of a ticket for manual action.

The alert that is identified in phase 402 is an indication of a LAN (Local Area Network) error or a communication error and the action that is performed in phase 405 is resetting the monitored device.

The alert that is identified in phase 402 is an indication of a control plane problem and the action that is performed in phase 405 is deactivating and activating LTE (Long Term Evolution) S1 link.

The alert that is identified in phase 402 is an indication of exceeded threshold in Twamp (Two-Way Active Measurement Protocol) measurement and the action that is performed in phase 405 is resetting the network device.

The alert that is identified in phase 402 is an indication of over 20 Bad Uplink events in a day or an indication of over 20 abnormal distribution events and the action that is performed in phase 405 is locking and opening a cell. It is to be noted that instead of 20, the threshold may be some other number such as for example 10, 30 or 50.

The action that is performed in phase 405 is deactivating and activating a functionality (e.g. data transmission functionality) in a cell and the different action that is performed in phase 404 is resetting the cell or a base station comprising the cell.

The action that is performed in phase 405 is an action affecting a cell and the different action that is performed in phase 404 is an action affecting a base station comprising the cell.

Alert identification in phase 402 comprises identification of a combination of an alert indicating temperature increase and a critical alert in the monitored device.

Alert identification in phase 402 comprises identification of a combination of an alert indicating temperature increase and a decrease in performance data level (such as throughput or signal level).

Figure 4B:
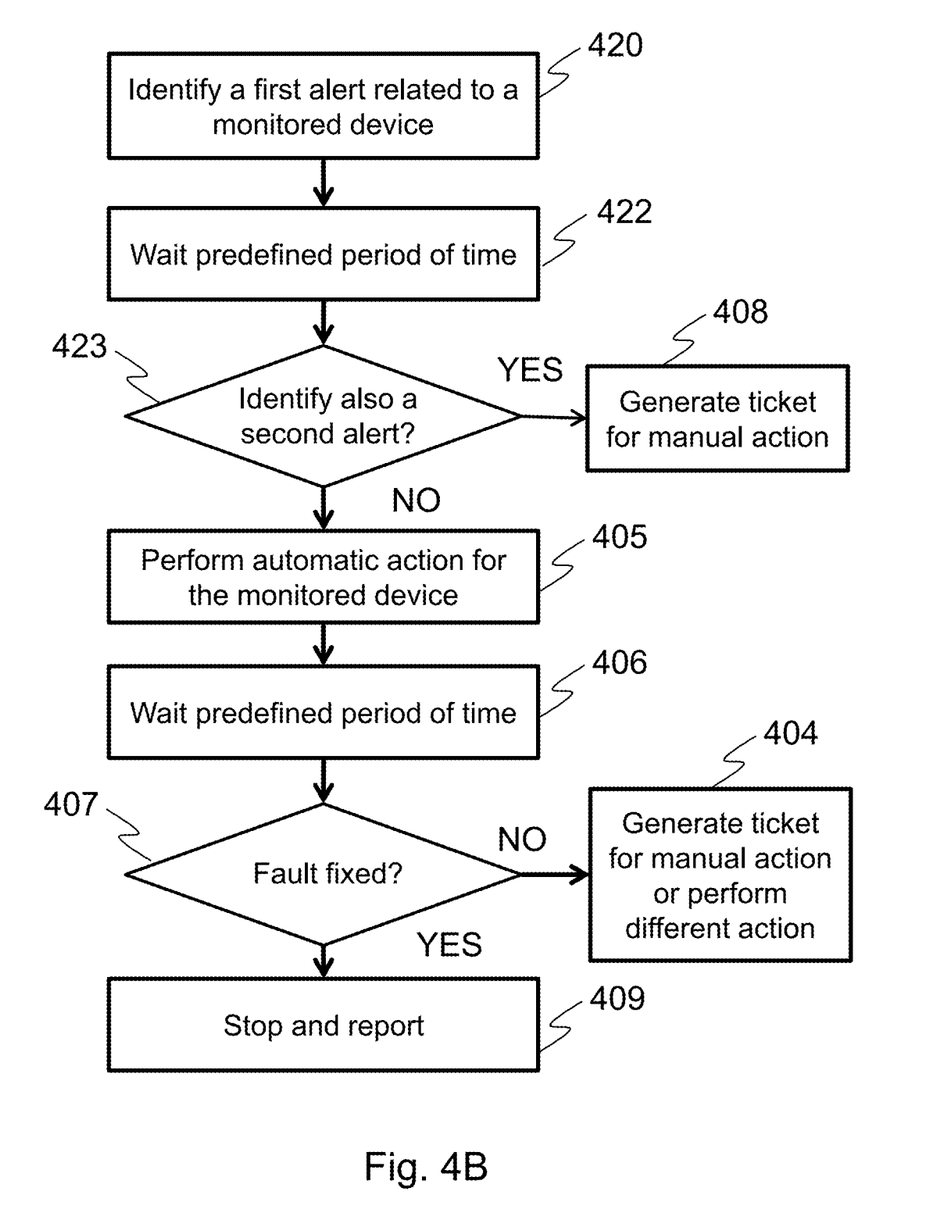

FIG. 4B shows a flow diagram illustrating a method according to an embodiment of the present disclosure. The method comprises following phases:

Phase 420: A first alert related to a monitored device is identified as a result of analyzing received alerts. Similarly to phase 402 of FIG. 4A, this phase may comprise filtering the alerts to reduce the number of alerts in further processing and/or classifying the alerts to different categories.

Phases 422 and 423: The process waits for a predefined period of time and checks if also a second alert is identified during this period of time. The predefined time may be for example 5 min, 10 min, 20 min, 30 min, 1 h or 3 h. The second alert may be different from the first alert or the same alert as the first alert. Additionally or alternatively, the second alert may be related to the same monitored device as the first alert or the second alert may concern some other monitored device.

If the second alert is identified, a ticket for manual action is generated in phase 408. In this way it is possible to quickly escalate the matter to manual handling in case there appears to be a more extensive problem in the group of monitored devices.

If the second alert is not identified within the predefined period of time, the process proceeds to phase 405 and an action is performed for the monitored device based on the identified first alert similarly as in FIG. 4A. That is, different action is performed in phases 408 and 405. In the example shown in FIG. 4B, the action in phase 408 is generating ticket for manual action. In yet another alternative the action in phase is an action performed for the monitored device, but the action is different from the action that would be performed in phase 405. For example, if both first and second alert are identified, the monitored device may be reset, whereas identification of only the first alert may result in a smaller scale action in the monitored device (e.g. deactivating and activating a functionality or restarting software). In this way it is possible to quickly perform an action that is likely to resolve a larger scale problem.

Phase 406: After performing the action, the process waits for a predefined period of time. This may be for example 5 min, 10 min, 20 min, 30 min or an hour. It is to be noted that the waiting time in phases 422 and 406 may be the same or different.

Phase 407: It is checked whether the fault causing the first alert was fixed. In an example embodiment this is implemented by checking if the first alert reappears. If the fault was fixed, the process stops in phase 409 and a report is generated to log the action that was taken by the automatic process. If the fault was not fixed, a ticket for manual action is generated in phase 404. Alternatively or additionally, the process may return to phase 405 to repeat the action for the monitored device. Yet another alternative (shown as an alternative in phase 404 of FIG. 4B) is to perform for the monitored device another action different from the action performed in phase 405. It is to be noted that the type of tickets generated in phases 404 and 408 may be different and targeted to different operations.

In an embodiment the alert that is identified in phase 420 is a cell faulty alert in a telecommunication network and the second alert in phase 423 is a link faulty alert in the telecommunication network. The action that is performed in phase 405 may be resetting the monitored device (the monitored device may be for example a base station). For example existence of one or more of the following alerts may be considered a cell faulty alert: monitored device disconnected, base station down, cell out of service, cell unavailable, and transmission interruption. The link faulty alert may be for example an SCTP (Stream Control Transmission Protocol) link fault alert. The ticket generated in phase 408 may be for transmission operations and the ticket generated in phase 404 may be for radio network operations.

Figure 4C:
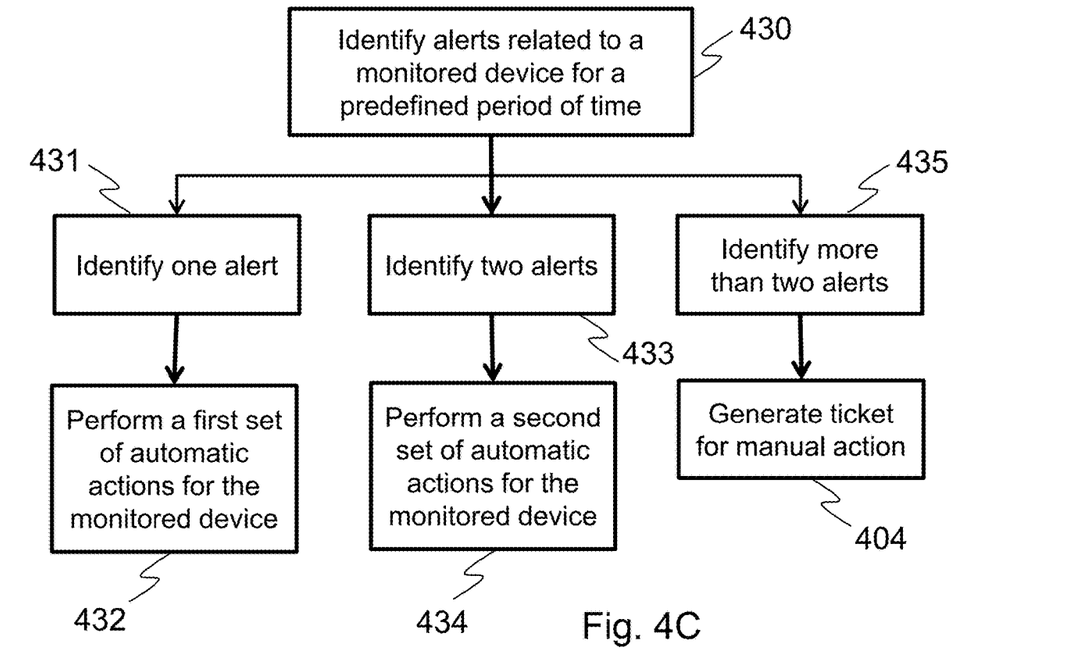

FIG. 4C shows a flow diagram illustrating a method according to an embodiment of the present disclosure. The method comprises following phases:

Phase 430: Alerts related to a monitored device are monitored and identified over a predefined period of time. The predefined time may be for example 5 min, 10 min, 20 min, 30 min, 1 h or 3 h. The time may be the same or different as in phase 406 or 422.

Phases 431 and 432: One alert is identified and a first set of automatic actions is performed for the monitored device. In an example embodiment, the first set of automatic actions comprises resetting the monitored device. The identified alert may be a cell faulty alert in a telecommunication network or some other alert.

Phases 433 and 434: Two alerts are identified and a second set of automatic actions is performed for the network device. In an example embodiment, the second set of automatic actions comprises resetting the monitored device and changing value of a parameter in the monitored device. The identified alerts may be consecutive cell faulty alerts or the alerts may be different types of alerts.

Phase 435: More than two alerts are identified for the monitored device. Consequently the process proceeds to phase 404 and a ticket for manual action is generated.

In another example embodiment, the first set of automatic actions in phase 432 comprises continuing monitoring the monitored device and the second set of automatic actions in phase 434 comprises an action affecting the operation of the monitored device, such as resetting the monitored device. In this way, the system does not react to individual errors in operation of the monitored devices. This may reduce the number of unnecessary actions as an individual error may be automatically solved without any action. If the error occurs at least two times, it is likely that some action is required to solve the problem and an automatic action affecting the operation of the monitored device is needed. In a further embodiment, at least two different alerts are identified in phase 433. For example, an alert indicating temperature increase combined with a critical alert in the monitored device may result in performing an automatic action, but alert indicating temperature increase alone does not necessarily lead to any action. The alerts identified in phase 433 are identified within predefined period of time and the alerts may be from the same source or from different sources to allow versatile problems to be identified.

Figure 4D:
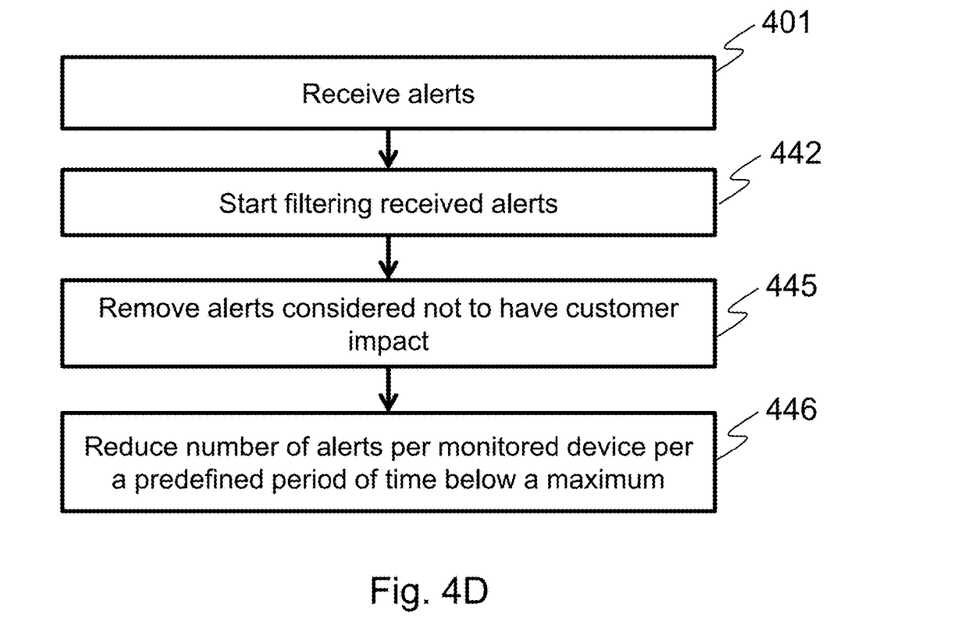

FIG. 4D shows a flow diagram illustrating a method according to an embodiment of the present disclosure. The method concerns filtering the alerts prior to further processing. This may be part of phase 402 or 420 of FIGS. 4A and 4B for example. The filtering may be performed on the basis of predefined rules. The method comprises following phases:

Phase 401: Alerts are received.

Phase 442: Filtering of the received alerts is started to reduce the number of alerts in further processing.

Phase 445: Alerts considered not to have customer impact are removed. There may be for example some alerts that a known not to affect customer experience or some alerts that cannot be avoided but do not require any actions to be taken. Such filtering may reduce the number of alerts considerably. For example in an example scenario concerning a telecommunication network only 50 000 alerts out of 1 000 000 alerts may be considered to have customer impact. Additionally or alternatively, alerts that are considered not to require reparative actions may be removed in this phase. Not having customer impact is one reason for this, but also other reasons exist. For example some alerts may come and go regularly without requiring any action or some alerts may relate to behavior that cannot be fixed. There may be for example some alerts that are known to cause for example degraded performance, but that cannot be fixed or that is known to automatically disappear.

Phase 446: Alerts per monitored device per a predefined time period are reduced below a maximum number. The maximum number may be for example 3, 4, 5, 6, 7 or 10 and the time period may be for example 10 min, 30 min, 1 h or 3 h.

Figure 4E:
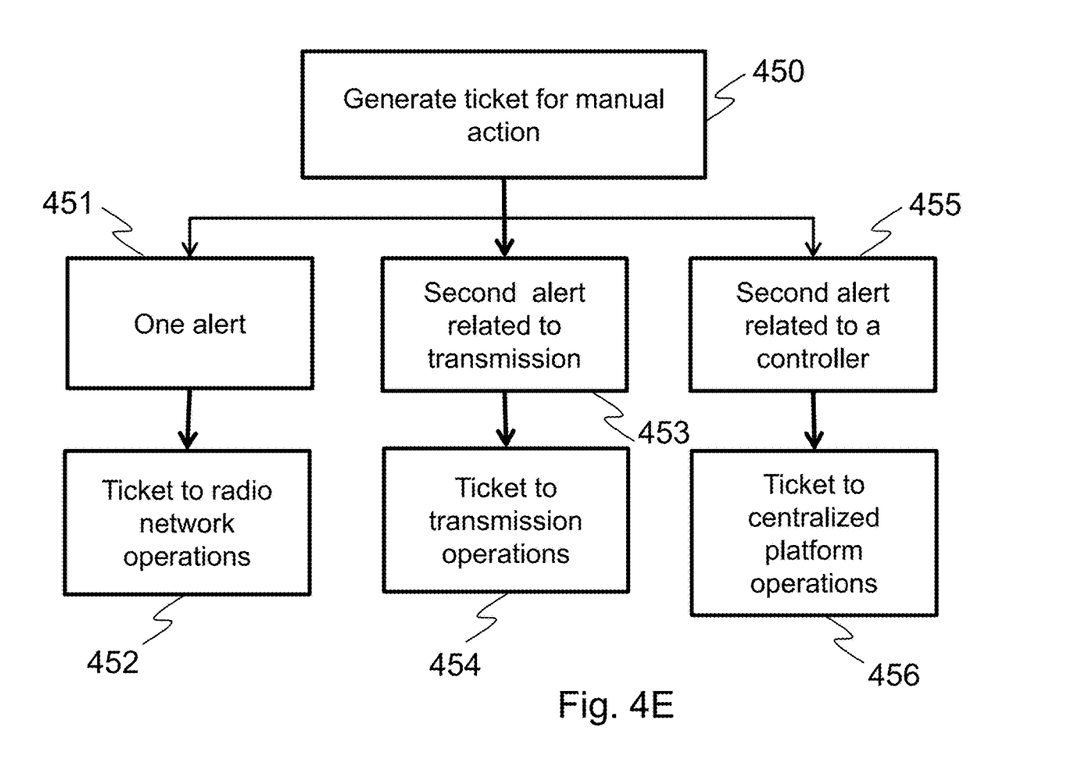

FIG. 4E shows a flow diagram illustrating a method according to an embodiment of the present disclosure. The method concerns monitoring of a telecommunication network and deciding what type of ticket to generate in case a ticket for manual action is generated in response to the automatic actions failing to fix the problems. In general, the ticket may be generated to different operations depending on the alerts that have been identified. In this way it is possible to select appropriate operations for the action based on importance of fixing the problem. The method comprises following phases:

Phase 450: A need to generate ticket for manual action is identified for example as disclosed in connection with FIGS. 4A-4C.

Phases 451 and 452: One alert has been identified and the ticket is generated to radio network operations.

Phases 453 and 454: A second alert related to transmission problems has been identified and the ticket is generated to transmission operations.

Phases 455 and 456: A second alert related to controller problems has been identified and the ticket is generated to centralized platform operations.

Figure 5:
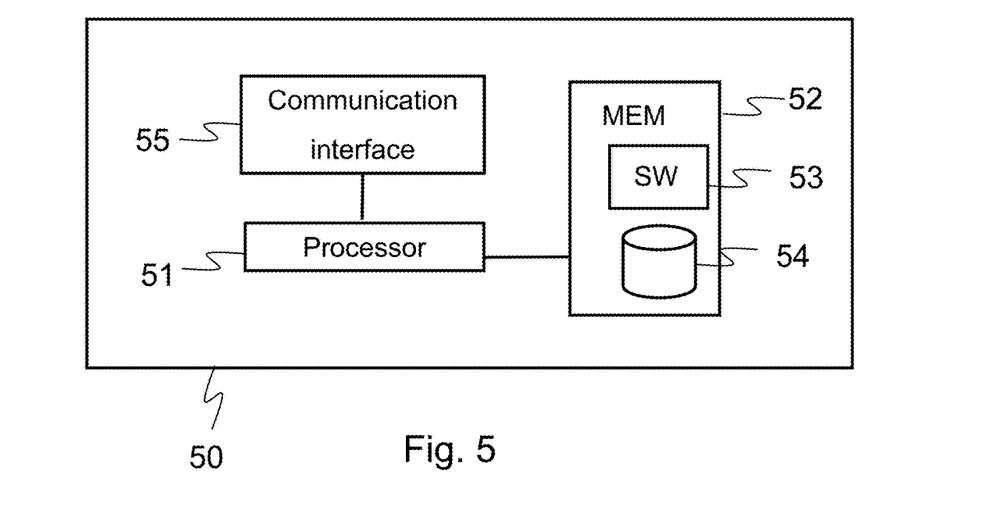
FIG. 5 shows an apparatus according to an embodiment.

FIG. 5 shows an apparatus 50 according to an embodiment. The apparatus 50 is for example a general-purpose computer or server or some other electronic data processing apparatus. The apparatus 50 can be used for implementing embodiments of the present disclosure. That is, with suitable configuration the apparatus 50 is suited for operating for example as the network monitoring and control system 111 of foregoing disclosure.

The general structure of the apparatus 50 comprises a processor 51, and a memory 52 coupled to the processor 51. The apparatus 50 further comprises software 53 and database 54 stored in the memory 52 and operable to be loaded into and executed in the processor 51. The software 53 may comprise one or more software modules and can be in the form of a computer program product. The database 54 may be usable for storing e.g. rules and patterns for use in data analysis. Further, the apparatus 50 comprises a communication interface 55 coupled to the processor 51.

The processor 51 may comprise, e.g., a central processing unit (CPU), a microprocessor, a digital signal processor (DSP), a graphics processing unit, or the like. FIG. 5 shows one processor 51, but the apparatus 50 may comprise a plurality of processors.

The memory 52 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 50 may comprise a plurality of memories. The memory 52 may be constructed as a part of the apparatus 50 or it may be inserted into a slot, port, or the like of the apparatus 50 by a user.

The communication interface 55 may comprise communication modules that implement data transmission to and from the apparatus 50. The communication modules may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. Further the apparatus 50 may comprise a user interface (not shown) for providing interaction with a user of the apparatus. The user interface may comprise a display and a keyboard, for example. The user interaction may be implemented through the communication interface 55, too.

The database 54 may be certain memory area in the memory 52 or alternatively the database 54 may be a separate component or the database 54 may be located in a physically separate database server that is accessed for example through the communication unit 55. The database unit 54 may be a relational (SQL) or a non-relational (NoSQL) database.

A skilled person appreciates that in addition to the elements shown in FIG. 5, the apparatus 50 may comprise other elements, such as microphones, displays, as well as additional circuitry such as memory chips, application-specific integrated circuits (ASIC), other processing circuitry for specific purposes and the like. Further, it is noted that only one apparatus is shown in FIG. 5, but the embodiments of the present disclosure may equally be implemented in a cluster of shown apparatuses.

Without in any way limiting the scope, interpretation, or application of the claims appearing below, a technical effect of one or more of the example embodiments disclosed herein is ability to automate network monitoring and control in telecommunication networks.

Another technical effect of one or more of the example embodiments disclosed herein is that increasing number of issues in monitored devices can be solved before they are visible to end users thereby improving user experience. Another technical effect of one or more of the example embodiments disclosed herein is that complex systems with increasing traffic amount can be handled without necessarily needing additional personnel for network monitoring tasks.

Another technical effect of one or more of the example embodiments disclosed herein is that risk of human errors may be reduced. For example in a NOC functionality it is likely that due to huge amount of alerts to be monitored, some alerts may go unnoticed by the monitoring personnel. Whereas, in the automated solution, all alerts are equally processed.

If desired, the different functions discussed herein may be performed in a different order and/or concurrently with each other. Furthermore, if desired, one or more of the before-described functions may be optional or may be combined.

Although various aspects of the disclosed embodiments are set out in the independent claims, other aspects of the disclosed embodiments comprise other combinations of features from the described embodiments and/or the dependent claims with the features of the independent claims, and not solely the combinations explicitly set out in the claims.

It is also noted herein that while the foregoing describes example embodiments of the present disclosure, these descriptions should not be viewed in a limiting sense. Rather, there are several variations and modifications, which may be made without departing from the scope of the present disclosure as defined in the appended claims.

The invention claimed is:

1. A computer implemented method of network monitoring and control, the method comprising
   receiving alerts related to monitored devices;
   analyzing the alerts to identify alerts related to a first monitored device;
   automatically performing at least one predefined action based on the identified alerts;
   checking whether one, two, or more than two alerts related to the first monitored have occurred during a predefined period of time;
   responsive to identifying that one alert related to the first monitored device has occurred during the predefined period of time, performing a first set of actions as the predefined action;
   responsive to identifying that two alerts related to the first monitored device have occurred during the predefined period of time, performing a second set of actions as the predefined action; and
   responsive to identifying that more than two alerts related to the first monitored device have occurred during the predefined period of time, generating a ticket for manual action as the predefined action.

2. The method of claim 1, further comprising prior to analyzing the alerts, filtering the received alerts to reduce the number of alerts to be analyzed by reducing number of alerts per monitored device per a second predefined period of time below a certain maximum number and/or removing alerts considered not to require reparative actions or not to have customer impact.

3. The method of claim 1, wherein the received alerts indicate one or more of the following: faulty or degraded operation, degraded performance, unavailable service, and a change in external conditions.

4. The method of claim 1, wherein the predefined action is an action affecting operation of the first monitored device.

5. The method of claim 1, wherein the predefined action comprises one or more of the following: resetting the monitored device, changing value of at least one parameter in the monitored device, closing a port in the monitored device, opening a port in the monitored device, and automatically generating a ticket for manual action.

6. The method of claim 1, wherein the first set of automatic actions comprises resetting the monitored device.

7. The method of claim 6, wherein the second set of automatic actions comprises resetting the monitored device and changing value of a parameter in the monitored device.

8. The method of claim 1, wherein the first set of automatic actions comprises continuing monitoring the monitored device and the second set of automatic actions comprises an action affecting the operation of the monitored device.

9. The method of claim 1, wherein the monitored devices are network devices of a telecommunication network.

10. The method of claim 1, wherein the monitored devices are network devices of a radio access network.

11. The method of claim 1, wherein the monitored devices are devices of a power grid or devices of a cable or television network.

12. The method of claim 1, wherein the monitored devices are electronic devices that are communicatively connected to a network monitoring and control system performing the method.

13. An apparatus comprising a processor, and
   a memory including computer program code; the memory and the computer program code configured to, with the processor, cause the apparatus to receive alerts related to monitored devices;
analyze the alerts to identify alerts related to a first monitored device;
automatically perform at least one predefined action based on the identified alerts;
check whether one, two, or more than two alerts related to the first monitored have occurred during a predefined period of time;
responsive to identifying that one alert related to the first monitored device has occurred during the predefined period of time, perform a first set of actions as the predefined action;
responsive to identifying that two alerts related to the first monitored device have occurred during the predefined period of time, perform a second set of actions as the predefined action; and
responsive to identifying that more than two alerts related to the first monitored device have occurred during the predefined period of time, generate a ticket for manual action as the predefined action.

14. A computer program comprising computer executable program code which when executed by a processor causes an apparatus to perform;
receiving alerts related to monitored devices;
analyzing the alerts to identify alerts related to a first monitored device;
automatically performing at least one predefined action based on the identified alerts;
checking whether one, two, or more than two alerts related to the first monitored have occurred during a predefined period of time;
responsive to identifying that one alert related to the first monitored device has occurred during the predefine period of time, performing a first set of actions as the predefined action;
responsive to identifying that two alerts related to the first monitored device have occurred during the predefine period of time, performing a second set of actions as the predefined action; and
responsive to identifying that more than two alerts related to the first monitored device have occurred during the predefined period of time, generating a ticket for manual action as the predefined action.

15. The apparatus of claim 13, wherein the memory and the computer program code are further configured to, with the processor, cause the apparatus to, prior to analyzing the alerts, filter the received alerts to reduce the number of alerts to be analyzed by reducing number of alerts per monitored device per a second predefined period of time below a certain maximum number and/or removing alerts considered not to require reparative actions or not to have customer impact.

16. The apparatus of claim 13, wherein the received alerts indicate one or more of the following: faulty or degraded operation, degraded performance, unavailable service, and a change in external conditions.

17. The apparatus of claim 13, wherein the first set of automatic actions comprises resetting the monitored device.

18. The apparatus of claim 17, wherein the second set of automatic actions comprises resetting the monitored device and changing value of a parameter in the monitored device.

19. The apparatus of claim 13, wherein the first set of automatic actions comprises continuing monitoring the monitored device and the second set of automatic actions comprises an action affecting the operation of the monitored device.

* * * * *